(12) United States Patent
Wang et al.

(10) Patent No.: US 9,490,557 B2
(45) Date of Patent: Nov. 8, 2016

(54) ELECTRONIC CARD CONNECTOR HAVING IMPROVED TERMINALS

(71) Applicant: FOXCONN INTERCONNECT TECHNOLOGY LIMITED, Grand Cayman (KY)

(72) Inventors: Yong-Qi Wang, Kunshan (CN); Guo-Dong Gu, Kunshan (CN); Tien-Chieh Su, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 14/688,171

(22) Filed: Apr. 16, 2015

(65) Prior Publication Data

US 2016/0006173 A1   Jan. 7, 2016

(30) Foreign Application Priority Data

Jul. 1, 2014   (CN) .......................... 2014 1 0306722

(51) Int. Cl.
| | |
|---|---|
| *H01R 13/62* | (2006.01) |
| *H01R 12/57* | (2011.01) |
| *H01R 13/24* | (2006.01) |
| *G06K 13/08* | (2006.01) |

(52) U.S. Cl.
CPC .............. *H01R 12/57* (2013.01); *G06K 13/08* (2013.01); *H01R 13/245* (2013.01)

(58) Field of Classification Search
CPC ........... H01R 13/6272; H01R 12/722; H01R 13/633; H01R 13/627; H01R 12/72; H01R 12/57; H01R 13/245; G06K 13/08

USPC .............. 439/157, 159, 160, 357, 629, 630; 235/441

See application file for complete search history.

(56) References Cited

U.S. PATENT DOCUMENTS

| | | | |
|---|---|---|---|
| 7,967,640 B2 | 6/2011 | Hashimoto et al. | |
| 2015/0050840 A1 | 2/2015 | Tsuji | |

FOREIGN PATENT DOCUMENTS

| | | |
|---|---|---|
| CN | 101783451 | 7/2010 |
| CN | 203288813 | 11/2013 |
| CN | 203398364 | 1/2014 |
| CN | 203415732 | 1/2014 |

(Continued)

OTHER PUBLICATIONS

Patent application JP 2013 169097, filed Aug. 16, 2013.*

*Primary Examiner* — Javaid Nasri
(74) *Attorney, Agent, or Firm* — Wei Te Chung; Ming Chieh Chang

(57) ABSTRACT

An electronic card connector (100) includes an insulative housing (1), a number of terminals (2), and a shielding shell (6). Each terminal includes an elastic portion extending upwardly and a contacting portion (23). The elastic portion is resiliently deformable in an up-to-down direction. A first part of the elastic portion is located in a first plane, and a second part of the elastic portion is located in a second plane forming a sharp angle with the first plane. The second part has a connecting portion (25) and a pair of frame portions (26) connected with two free ends of the connecting portion. Each terminal defines a front point and a rear point respectively located on the elastic portion. The front point is located at the front of the contacting portion and the rear point is located at the rear of the contacting portion along a card-inserting direction.

12 Claims, 7 Drawing Sheets

(56) References Cited

FOREIGN PATENT DOCUMENTS

| CN | 103579810 | 2/2014 |
| CN | 203826608 | 9/2014 |
| JP | 2009295496 | 12/2009 |
| TW | M466378 | 11/2013 |
| WO | 02073819 | 9/2002 |

* cited by examiner

ELECTRONIC CARD CONNECTOR HAVING IMPROVED TERMINALS

BACKGROUND OF THE INVENTION

1. Field of the Invention

The present invention relates generally to an electronic card connector, and more particularly to an electronic card connector having improved terminals.

2. Description of Related Arts

Japan Patent No. JP2009295496 discloses a card connector including a housing, a number of terminals, and a metal shell. Each terminal includes a contacting portion, a rectangular frame portion, and an inclined supporting portion between the frame portion and the contacting portion. The supporting portion extends in a direction perpendicular to a card insertion direction.

U.S. Pat. No. 7,967,640 discloses a card connector designed for working with a Subscriber Identity Module (SIM) card. The rectangular SIM card is inserted into the card connector in such a manner that the shorter side of the card is parallel to the direction of card insertion. Contacts of the connector each include a contact portion, two elastic deformation portions, and a terminal portion. The two elastic deformation portions are coupled together so as to substantially form an isosceles triangle shape with a vertex angle $\theta_1$ at a vertex corresponding to the contact portion. The contact is arranged in an inverted V shape with respect to the card insertion direction.

An electronic card connector having improved terminals is desired.

SUMMARY OF THE INVENTION

Accordingly, an object of the present invention is to provide an electronic card connector having improved terminals to prevent damage of contacting portions thereof.

To achieve the above object, An electronic card connector comprising: an insulative housing defining a receiving cavity and a base portion, the base portion having a plurality of terminal-receiving slots and an upper surface; a plurality of terminals each comprising an affixed portion retained in the base portion, an elastic portion extending upwardly into the receiving cavity, and a contacting portion formed at the elastic portion, each terminal defining a front point and a rear point respectively located on the elastic portion, the front point located in front of the contacting portion and the rear point located behind the contacting portion with respect to a card-inserting direction, a first part of the elastic portion located in a first plane, a second part of the elastic portion located in a second plane angled with respect to the first plane, the second part of the elastic portion having a connecting portion and a pair of frame portions connected with two free ends of the connecting portion, the elastic portion, the connecting portion, and the frame portions being resiliently deformable in an up-to-down direction; and a shielding shell attached to the insulative housing.

DETAILED DESCRIPTION OF THE PREFERRED EMBODIMENT

Figure 1:
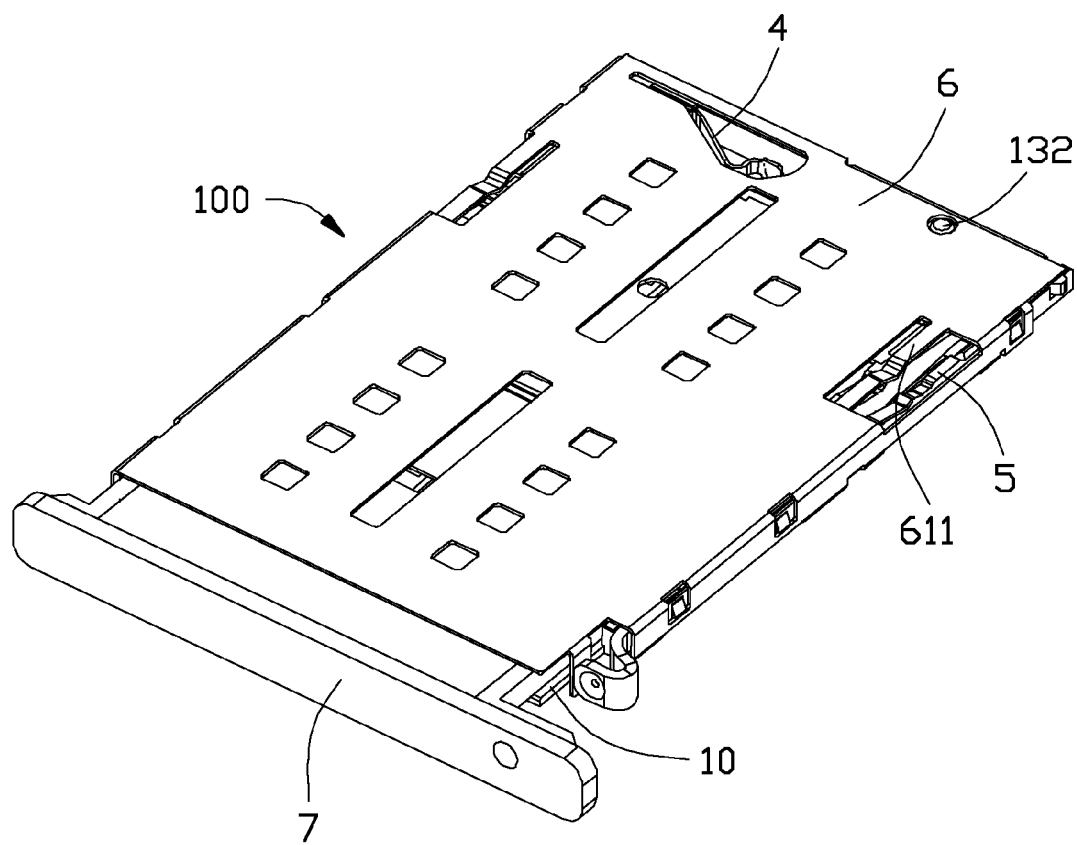
FIG. 1 is a perspective, assembled view of an electronic card connector.

Reference will now be made in detail to the preferred embodiment of the present invention.

Referring to FIGS. 1 to 7, an electronic card connector 100 of the present invention includes an insulative housing 1, a plurality of terminals 2 and a metal sheet 3 both affixed to the insulative housing 1, a switch or detecting contact 4 located at an end of the insulative housing 1, an ejector 5 located in the insulative housing 1, and a shielding shell 6 attached to the insulative housing 1 and defining a receiving cavity 10 therebetween. Understandably, the ejector 5 includes a pushing bar moveable along the front-to-back direction and a lever pivotally about a vertical axis. The electronic card connector 100 further has a tray 7 assembled in the receiving cavity 10 and capable of receiving two SIM cards at the same time. The electrical connector 100 defines a card-inserting direction, a front end and a rear end in FIG. 1.

Referring to FIGS. 1 to 4, the insulative housing 1 includes a base portion 11, a side wall 12 located in one side of the base portion 11, and a front wall 13 extending upwardly from the base portion 11. The front wall 13 is formed with a depression 131 for receiving the switch 4 and a rotating pillar 132 shaped in a pillar for fixing the ejector 5. The base portion 11 is formed with a number of terminal-receiving slots 113 located in two rows.

The terminals 2 are located in two rows and received in the terminal-receiving slots 113. Each terminal 2 includes an affixed portion 21 retained in the insulative housing 1, an elastic portion extending upwardly into the receiving cavity 10, a contacting portion 23 rising into the receiving cavity 10, and a soldering portion 24 extending from the affixed portion 21. The elastic potion includes a pair of elastic arms 22 extending upwardly to converge on the contacting portion 23, a connecting portion 25, and a pair of frame portions 26 connected with two end points of the connecting portion 25. The elastic portion is resiliently deformable in an up-to-down direction. The connecting portion 25 plays an important role in stability so that an excessive drop of elastic deformation quantity of the two elastic arms 22 due to unequal pressure is reduced to avoid a plastic deformation of the two elastic arms 22. In this embodiment, the terminals 2 are divided in two teams numbering eight and configured in the insulative housing 1 in the card-inserting direction. The neighboring terminals 2 in the same team located along the card-inserting direction extend in a contrary direction to shorten the length of the electronic card connector 100. The contacting portions 23 in a row along the card-inserting direction are arranged in a straight line.

Figure 6:
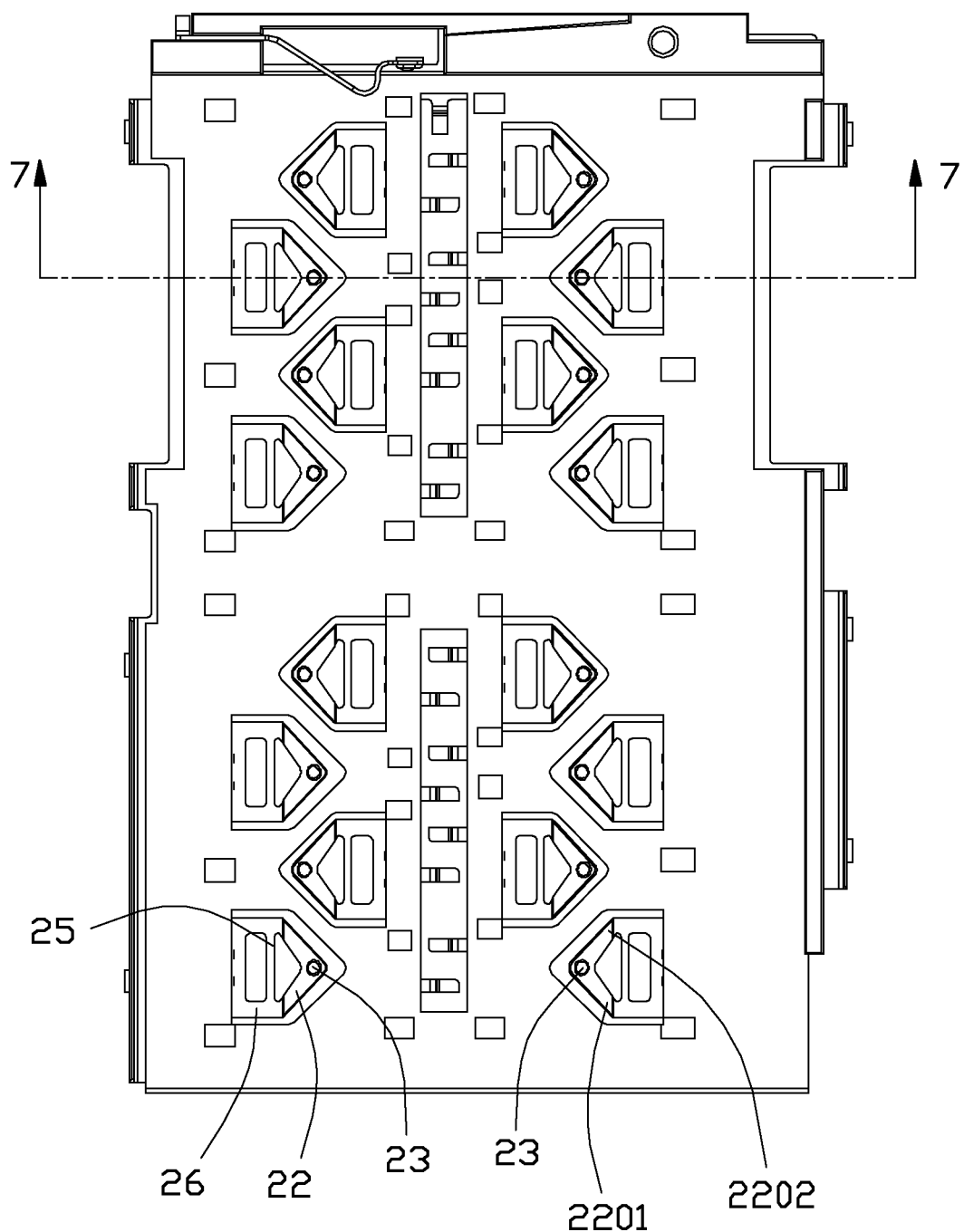
FIG. 6 is a top view of the electrical card connector without a shielding shell, an ejector, and a tray.
Figure 7:
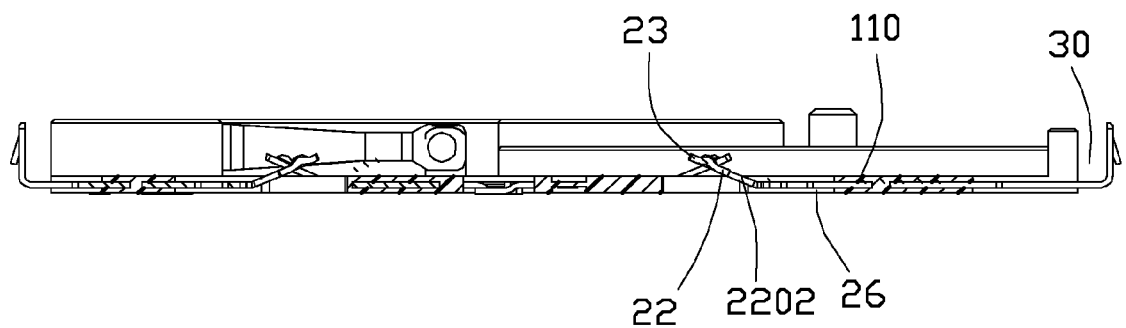
FIG. 7 is a cross-sectional view of the electrical card connector along line 7-7 in FIG. 6.

Referring to FIGS. 2 to 5, the frame portion 26 together with the connecting portion 25 and the affixed portion 21 is located in a first plane parallel to the base portion 11 in this embodiment. The two elastic arms 22 are located in a second plane forming a sharp angle with the first plane. The affixed portion 21 of each terminal 2 is embedded in the base portion 11. The frame portions 26 and the connecting portion 25 of each terminal 2 are exposed to the terminal-receiving slot 113 and capable of elastic deformation along the up-to-down direction. The two frame portions 26 are parallel to each other and each frame portion 26 connects corresponding elastic arm 22 to corresponding affixed portion 21. Referring to FIGS. 6 to 7, the elastic arms 22 employ a cantilever beam arrangement to rise into the receiving cavity 10. The base portion 11 defines an upper surface 110 higher than a plane where the affixed portion 21, connecting portion 25, and the frame portion 26 are located. The affixed portion 21, the frame portion 26, the connecting portion 25, the elastic arm 22, and the contacting portion 23 are located along a transverse direction perpendicular to the card-inserting direction and configured in this embodiment so that the terminals 2 is not easy to collapse or be broken when the tray 7 is movable.

In other embodiment, the elastic arm 22 can be configured as winding or curved shape. The two elastic arms 22 of each terminal 2 respectively define a rear point 2201 and a front point 2202. The rear point 2201 is located at the back of the contacting portion 23 and the front point 2202 is located at the front of the contacting portion 23. The connecting portion 25 in different embodiments is located beside the base portion 11 and connected with the affixed portion 21 or separated from the affixed portion 21. Optionally, the number of the connecting portion 23 is two, one is located beside the base portion 11 and connected with the affixed portion 21, and the other is separated from the affixed portion 21.

Figure 2:
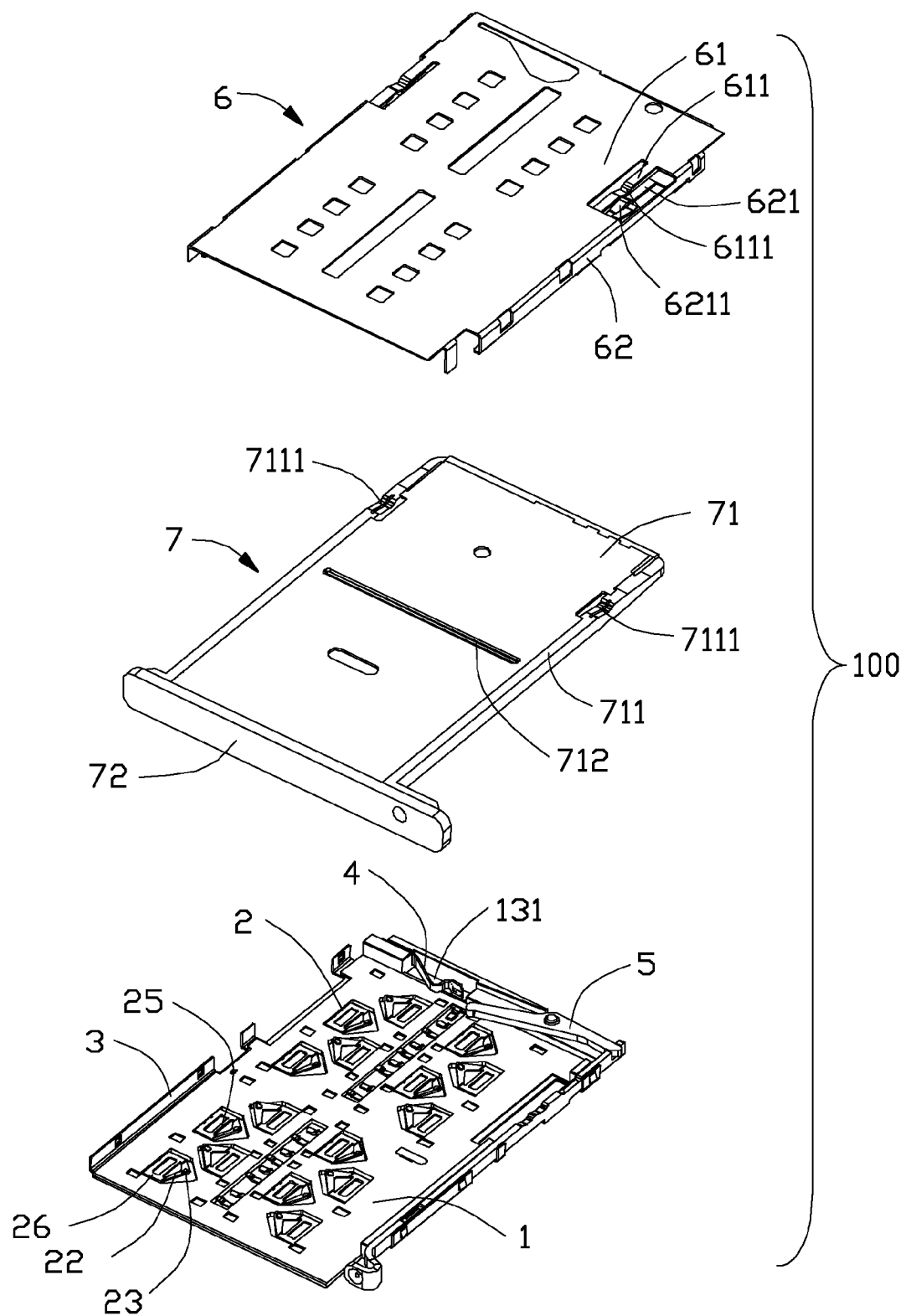
FIG. 2 is a perspective, partly exploded view of the electrical card connector.
Figure 3:
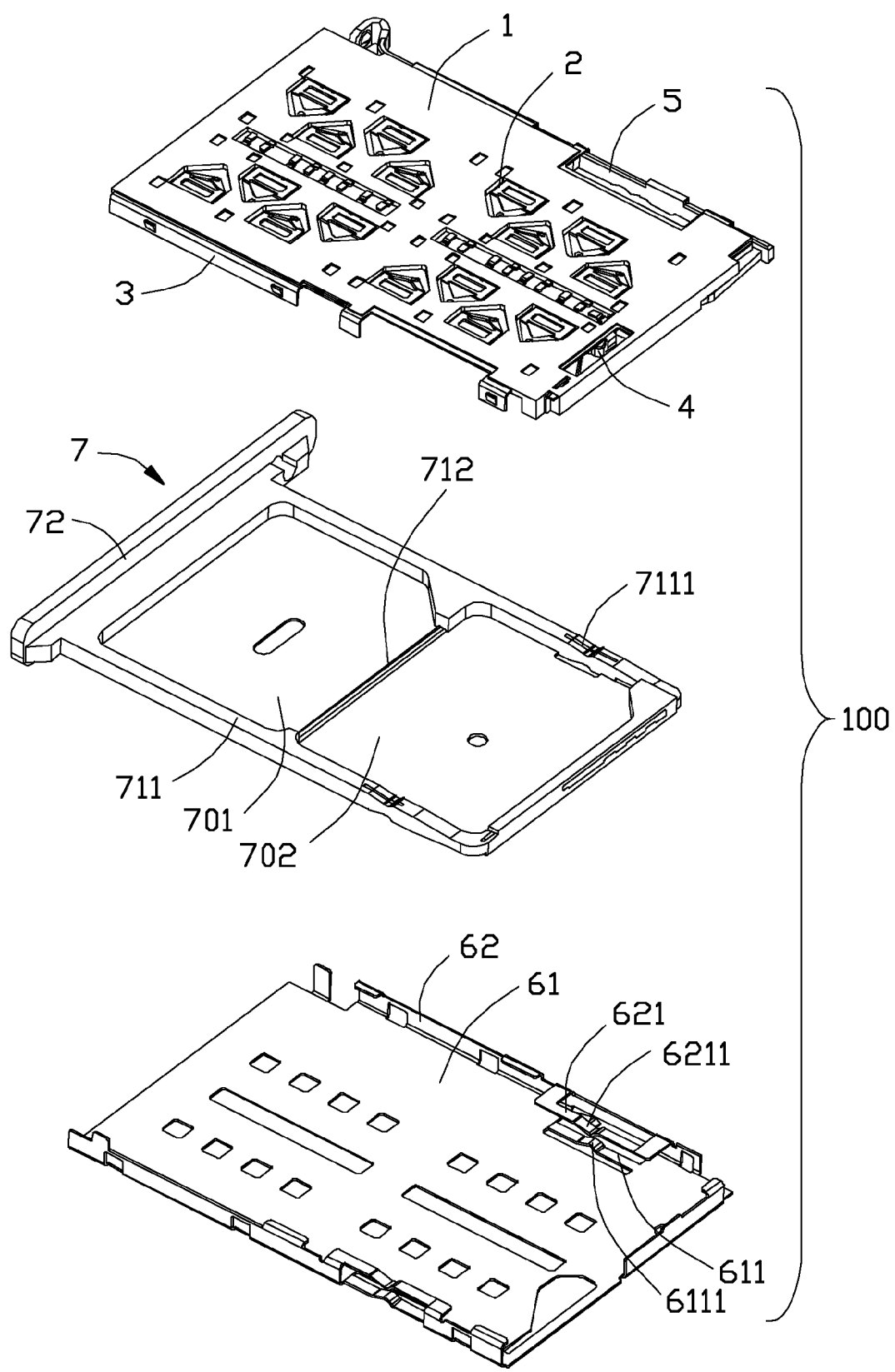
FIG. 3 is another perspective, partly exploded view of the electrical card connector.
Figure 4:
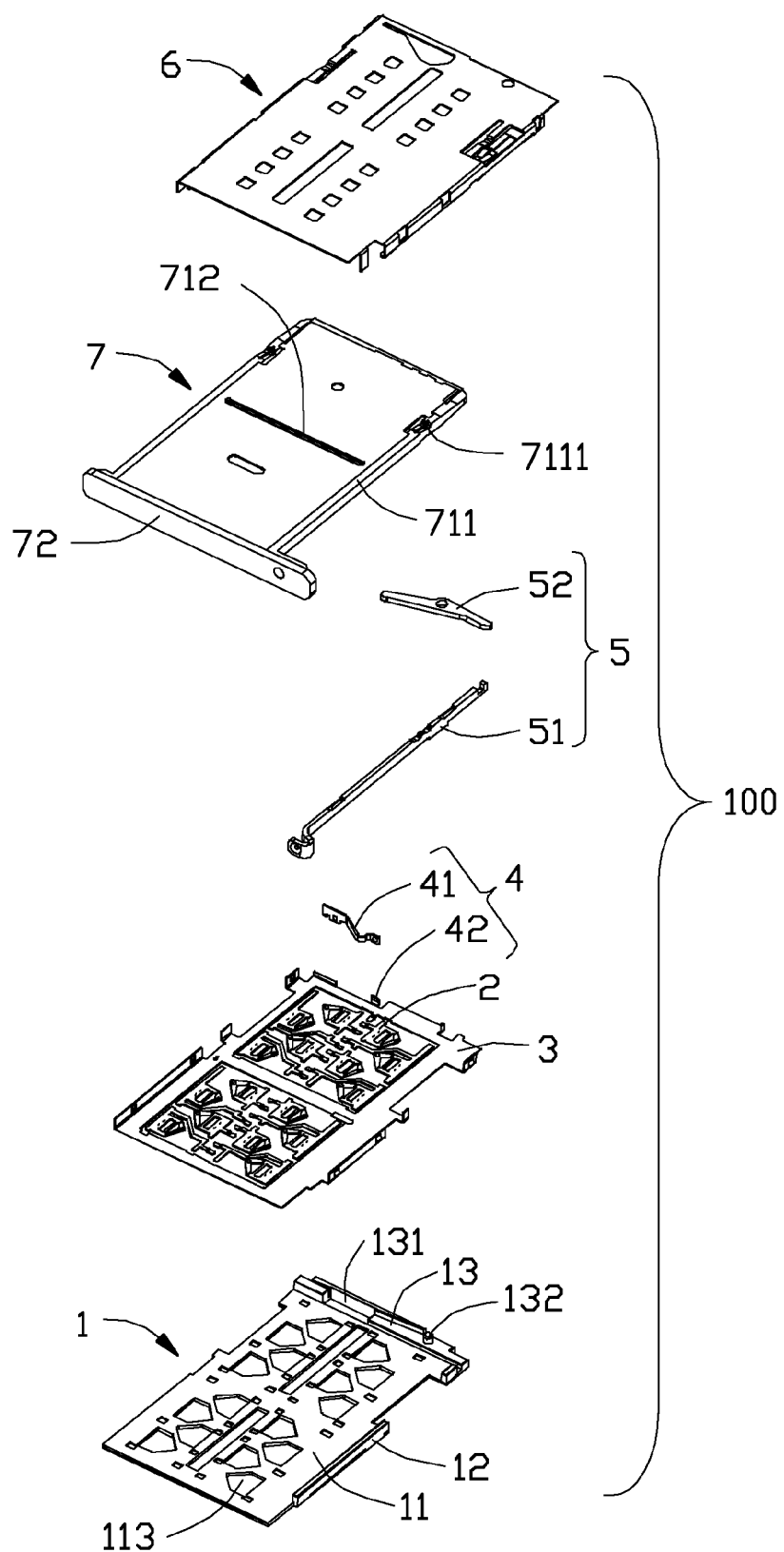
FIG. 4 is a further perspective, exploded view of the electronic card connector.
Figure 5:
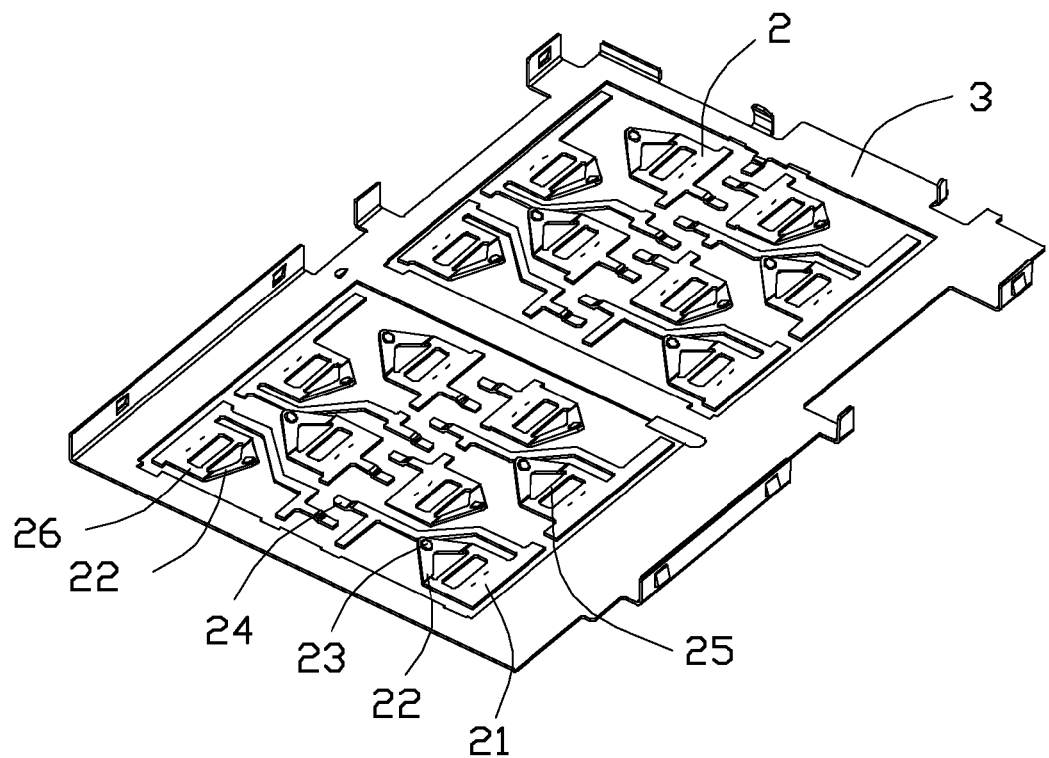
FIG. 5 is a perspective, assembled view showing a number of terminals and a metal sheet embedded in an insulative housing.

Referring to FIGS. 2 to 4, the switch 4 includes a movable terminal 41 and an affixed terminal 42 retained in the front wall 13 and received in the depression 131. The switch 4 stays closed when the tray 7 is absent, while the switch 4 stays separated when the tray 7 is assembled.

Referring to FIGS. 2 to 4, the ejector 5 includes a lever 51 and a cam 52 configured as prior arts.

Referring to FIGS. 1 to 4, the shielding shell 6 includes a main body 61, a pair of side bodies 62 extending downwardly from the main body 61, a locking portion 611 located on the main body 61 and a locking arm 621 located on the side body 62 and extending horizontally into the receiving cavity 10. The locking portion 611 has a protrusion 6111 therein protruding to the receiving cavity 10. The locking arm 621 has a projection 6211 therein protruding to the receiving cavity 10 and corresponding to the protrusion 6111. In this embodiment, the locking arm 621 is located under the locking portion 611 in the up-to-down direction, so that the projection 6211 is located under the protrusion 6211 in the up-to-down direction. The locking portion 611 and the locking arm 621 are both affixed beams to make the protrusion 6111 and the projection 6211 capable of elastic deformation in the up-to-down direction.

Referring to FIGS. 1 to 4, the tray 7 is formed as a rectangle frame and includes a card-receiving room 70, a panel portion 71, an operating portion 72 connected with the panel portion 71, and a partition 712. The partition 712 separates the card-receiving room 70 to a first receiving part 701 and a second receiving part 702 to receive two SIM cards at the same time. The first receiving part 701 and the second receiving part 702 are located along the card-inserting direction and has a same dimension. The panel portion 71 has a pair of side portions 711 and a pair of notches 7111 located on the upper and bottom surface of the side portion 711. The notches 7111 are engaged with the protrusion 6111 and the projection 6211 to lock the tray 7 in the receiving cavity 10.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electronic card connector comprising:
   an insulative housing defining a receiving cavity and a base portion, the base portion having a plurality of terminal-receiving slots and an upper surface;
   a plurality of terminals each comprising an affixed portion retained in the base portion, an elastic portion extending upwardly into the receiving cavity, and a contacting portion formed at the elastic portion, each terminal defining a front point and a rear point respectively located on the elastic portion, the front point located in front of the contacting portion and the rear point located behind the contacting portion with respect to a card-inserting direction, a first part of the elastic portion located in a first plane, a second part of the elastic portion located in a second plane angled with respect to the first plane, the second part of the elastic portion having a connecting portion and a pair of frame portions connected with two free ends of the connecting portion, the elastic portion, the connecting portion, and the frame portions being resiliently deformable in an up-to-down direction; and
   a shielding shell attached to the insulative housing;
   wherein
   said first part of the elastic portion comprises a pair of elastic arms extending upwardly into the receiving cavity and converging on the contacting portion, and the first point and the second point of each terminal are respectively defined in the two elastic arms and located at the same side of the contacting portion along a transverse direction perpendicular to the card-inserting direction.

2. The electronic card connector as claimed in claim 1, wherein each terminal has a soldering portion extending from the affixed portion, the affixed portion connecting the two frame portions and embedded in the base portion, the connecting portion, the frame portions, and the affixed portion form an enclosed construction, and the contacting portion and the connecting portion form an enclosed construction.

3. The electronic card connector as claimed in claim 2, wherein the connecting portion is separated from the affixed portion.

4. The electronic card connector as claimed in claim 2, wherein the elastic arms and the connecting portion form a triangle.

5. The electronic card connector as claimed in claim 2, wherein the connecting portion is located beside the base portion and connected with the affixed portion.

6. The electronic card connector as claimed in claim 1, further comprising a tray, and wherein the shielding shell has a locking portion located on a top surface thereof and a locking arm located on a side surface thereof and extending horizontally into the receiving cavity, the locking portion has a protrusion therein protruding to the receiving cavity, the locking arm has a projection protruding into the receiving cavity, and the protrusion and the projection lock the tray in place.

7. The electronic card connector as claimed in claim 1, wherein each contacting portion has an apex, and the apexes of the contacting portions located in a card-inserting direction are staggered along a left-to-right direction.

8. The electronic card connector as claimed in claim 6, wherein said tray has a number of notches located on the upper and bottom surface thereof, and the notches are engaged with the protrusion and the projection to lock the tray in the receiving cavity.

9. The electronic card connector as claimed in claim 8, wherein the locking portion and the locking arm are both affixed to resiliently deform the protrusion and the projection in the up-to-down direction.

10. An electronic card connector for use with an electronic card, comprising:
  an insulative housing defining an imaginary centerline extending along a front-to-back direction and an elongated slot formed in the housing along said centerline;
  a metallic shielding shell attached to the housing with a tray receiving cavity therebetween in a vertical direction perpendicular to said front-to-back direction; and
  a plurality of terminals secured to the housing via an insert-molding process, said terminals divided into first and second groups respectively and symmetrically located by two opposite sides of the centerline in a transverse direction perpendicular to said front-to-back direction and said vertical direction, each of said terminals forming a resilient contacting section extending into the tray receiving cavity and deflectable in the vertical direction, and a soldering tail exposed in the elongated slot; and
  a tray back and forth moveably received within the tray receiving cavity in said front-to-back direction and defining a card receiving room for carrying the electronic card; wherein
  the shielding shell forms an opening with portions aligned with said elongated slot in the vertical direction for inspecting the soldering tails after the connector is mounted to a corresponding printed circuit board;
  said contacting section forms a home base contour thereof;
  a centerline of said contacting section extends along said transverse direction;
  said contacting section forms at least one opening so as to result in a frame structure for increasing resiliency thereof to comply with insertion/withdrawal of the electronic card; and
  said frame structure includes a transverse base between a trianglar shape and a rectangular shape of said home base contour.

11. The electronic card connector as claimed in claim 10, wherein said tray is further equipped with a panel portion beside the card receiving room in the vertical direction for supporting the electronic card, and said card receiving room is located between said panel portion and said housing in the vertical direction when said tray is received within the tray receiving cavity.

12. The electronic card connector as claimed in claim 10, further including around an end of the housing a lever pivotal about an axis extending along the vertical direction for ejecting the electronic card, and a detecting contact deflectable in said front-to-back direction for sensing insertion of the electronic card, wherein an ejecting end of said lever and a distal end of said detecting contact are both located around the centerline of the housing.

* * * * *